UNITED STATES PATENT OFFICE.

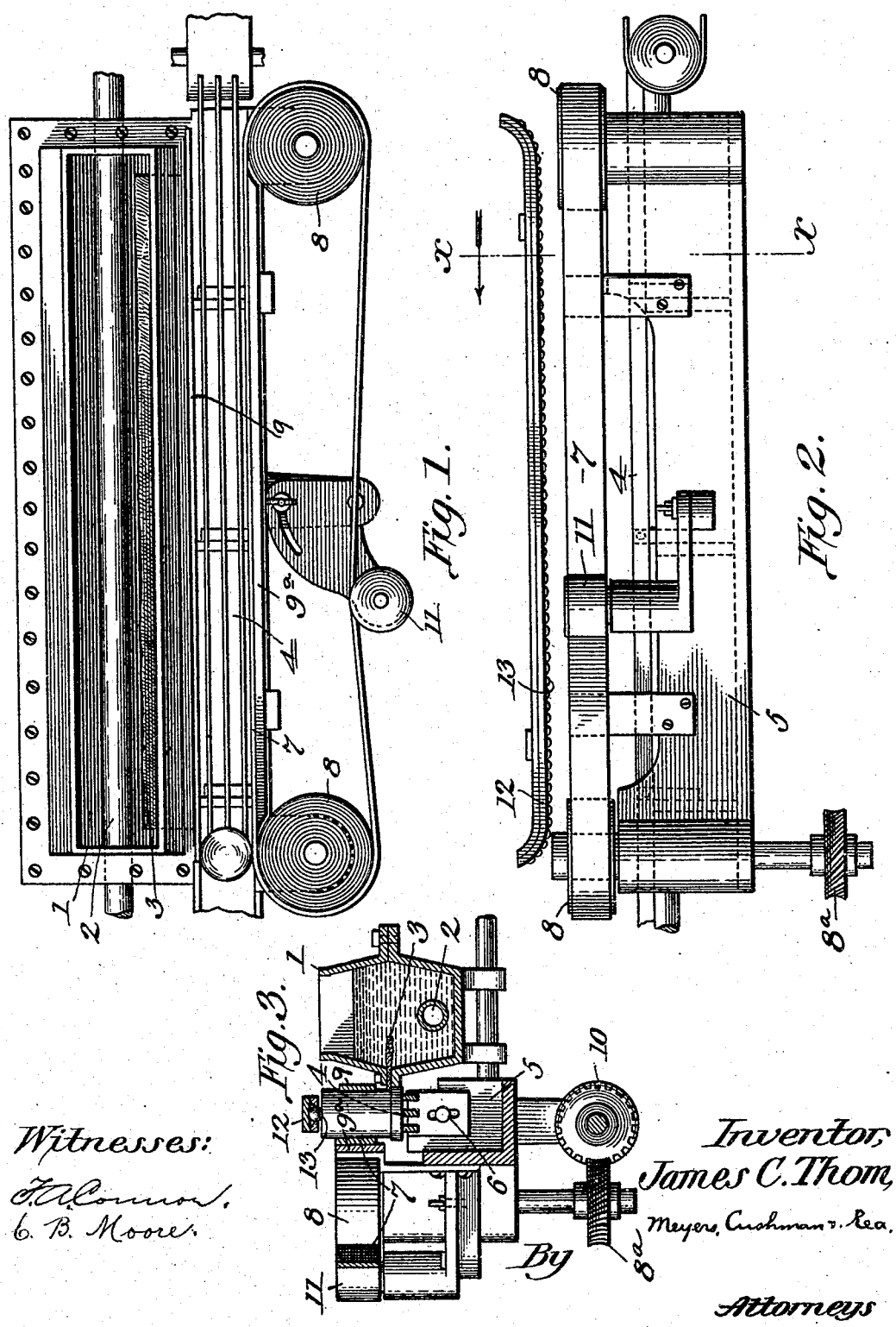

JAMES CRAWFORD THOM, OF HELMETTA, NEW JERSEY, ASSIGNOR TO AMERICAN SNUFF COMPANY, OF NEW YORK, N. Y., A CORPORATION OF NEW JERSEY.

SEALING APPARATUS.

939,453. Specification of Letters Patent. Patented Nov. 9, 1909.

Application filed January 16, 1907. Serial No. 352,511.

*To all whom it may concern:*

Be it known that I, JAMES C. THOM, a citizen of the United States, residing at Helmetta, in the county of Middlesex and State of New Jersey, have invented new and useful Improvements in Sealing Apparatus, of which the following is a specification.

My invention relates to improvements in sealing apparatus, more particularly, though not exclusively, intended to apply a sealing-medium about and to close the otherwise exposed connection of a cylindrical vessel and its cover, chiefly for the purposes of hermetically sealing the contents of the vessel.

The invention is embodied in the apparatus hereinafter shown and described; and that which is claimed as new will be set forth in the claims appended to the description.

In the accompanying drawings illustrating the invention, Figure 1 is a plan view of the apparatus, Fig. 2 a side elevation, and Fig. 3 a transverse section.

In the said drawings is illustrated the best-known embodiment of the invention and all the details thereof. The invention, however, is not restricted to such embodiment or details except as may be specifically required by the clauses of the claim.

In the said drawing the reference numeral 1 designates a tank which may be provided with means 2, where the nature of the sealing - medium is such as to require it, for maintaining the sealing-medium in fit condition for use—and in this connection it may be stated that paraffin is recommended and a steam heating pipe for maintaining it in a liquid condition.

The tank 1 is slotted longitudinally and in this slot is disposed a capillary wick 3, in communication with the sealing-medium for supply, and exposed in position for application of the medium. In front of the tank 1 is a runway 4 for the articles to be sealed, which is adjustably supported from a common frame 5, of suitable conformation to support all of the operative parts. This runway is made adjustable for the purpose of bringing the article to such position that the line or area to be sealed will be opposite the exposed portion of the wick 3, and this adjustment is secured, in the illustrated example of the invention, by a slot and pin connection 6 of the runway with the frame 5. Means are provided to hold the articles to be sealed against the wick and to rotate the articles in their passage past and in contact with the sealing - medium - applying wick 3. Such means, as shown, consists of an endless traveling belt 7, passing about rolls 8, and coöperating with a gage rail 9 so positioned that the articles to be sealed will be passed in proper relation to the wick 3 for the designed application of the sealing-medium thereto. The belt 7 is caused to travel, in the embodiment of the invention shown, by means of an extension of one of the rollers 8 provided with a gear $8^a$, driven by a gear 10 impelled from any suitable source of power.

The endless belt is kept taut to properly perform its office by means of an adjustable tension roller 11, the adjusting elements being shown as slot and pin, and the run of said belt which engages the articles being treated is supported by a bar $9^a$ carried by a bracket from the frame 5. Coöperating with the runway 4, guide rail 9, and endless belt 7 to properly position the article to be sealed in relation to the wick 3 and to confine the same to insure rotation by the belt 7 is a guide 12 flared at its ends to permit ready entrance and exit to the article to be sealed; and this guide rail way be provided with ball-bearings 13 to reduce friction.

In practice the articles to be sealed are introduced onto the runway 4, by hand or automatically, the runway being adjusted properly by the means described or in other suitable way with relation to the wick 3 to apply the sealing medium as designed, and then the endless belt causes the rotation of the articles to be sealed in their passage past the wick, and in so doing, in part at least, serves or assists in their propulsion. In this operation the guide gage 9 and guide 12 take part in the proper positioning of the article to be sealed in its relation to the sealing-medium-applying wick.

The invention is believed to be most useful in applying a sealing medium to the joint between a vessel and its closure cover; but, of course, it is contemplated that the invention is not restricted to the use, but is claimed for all the uses for which it is capable.

Having thus described my invention what I claim is:—

1. In a sealing apparatus, a tank for the sealing medium having a slotted wall, a frame, a run-way carried by said frame and located adjacent to and parallel with the slotted wall of the tank, a sealing medium conveyer located in the slotted wall of the tank and extending into the path of movement of the articles to be sealed on said runway, a gage rail located above and at the side of the run-way adjacent the tank, a belt supporting bar opposite the gage rail at the other side of the run-way, and an endless belt traversing and supported by said bar.

2. In a sealing apparatus, a tank for the sealing medium having a slotted wall, a frame, a run-way carried by said frame and located adjacent to and parallel with the slotted wall of the tank, a sealing medium conveyer located in the slotted wall of the tank and extending into the path of movement of the articles to be sealed on said runway, a gage rail located above and at the side of the run-way adjacent the tank, a belt supporting bar opposite the gage rail at the other side of the run-way, an endless belt traversing and supported by said bar, and a guide over the run-way to bear against the articles to be sealed in their travel along said run-way.

In testimony whereof I have hereunto set my hand in presence of two subscribing witnesses.

JAMES CRAWFORD THOM.

Witnesses:
ARTHUR K. SHUMWAY,
P. HENRY CORBETT.